(12) United States Patent
Parenti

(10) Patent No.: US 6,305,107 B1
(45) Date of Patent: Oct. 23, 2001

(54) LICENSE PLATE LOCK

(76) Inventor: Steve Parenti, 36425 Newark Blvd., Newark, CA (US) 94560

( * ) Notice: Subject to any disclaimer, the term of this patent is extended or adjusted under 35 U.S.C. 154(b) by 0 days.

(21) Appl. No.: 09/267,902

(22) Filed: Mar. 11, 1999

(51) Int. Cl.[7] .................................................. G09F 7/00
(52) U.S. Cl. .............................. 40/201; 40/207; 70/232
(58) Field of Search ............................ 40/200, 201, 202, 40/203, 207, 210; 70/DIG. 57, 230, 232

(56) References Cited

U.S. PATENT DOCUMENTS

| | | | |
|---|---|---|---|
| 1,821,053 | * | 9/1931 | Dietz et al. ........................... 40/202 |
| 1,948,554 | * | 2/1934 | Williams ............................... 40/203 |
| 3,600,912 | * | 8/1971 | Foreman ............................. 70/230 X |
| 4,144,729 | * | 3/1979 | Nielsen, Jr. ........................ 70/232 X |
| 4,223,542 | * | 9/1980 | Basseches .................. 70/DIG. 57 X |
| 5,839,303 | * | 11/1998 | Umberg et al. .................... 70/232 X |

* cited by examiner

Primary Examiner—Joanne Silbermann
(74) Attorney, Agent, or Firm—James Hillman

(57) ABSTRACT

The present invention is a license plate locking device that operates with a cylindrical lock. The license plate locking device has a renewal sticker theft prevention window locking device that is applicable for license plates which display such renewal stickers in any corner of the license plates.

4 Claims, 6 Drawing Sheets

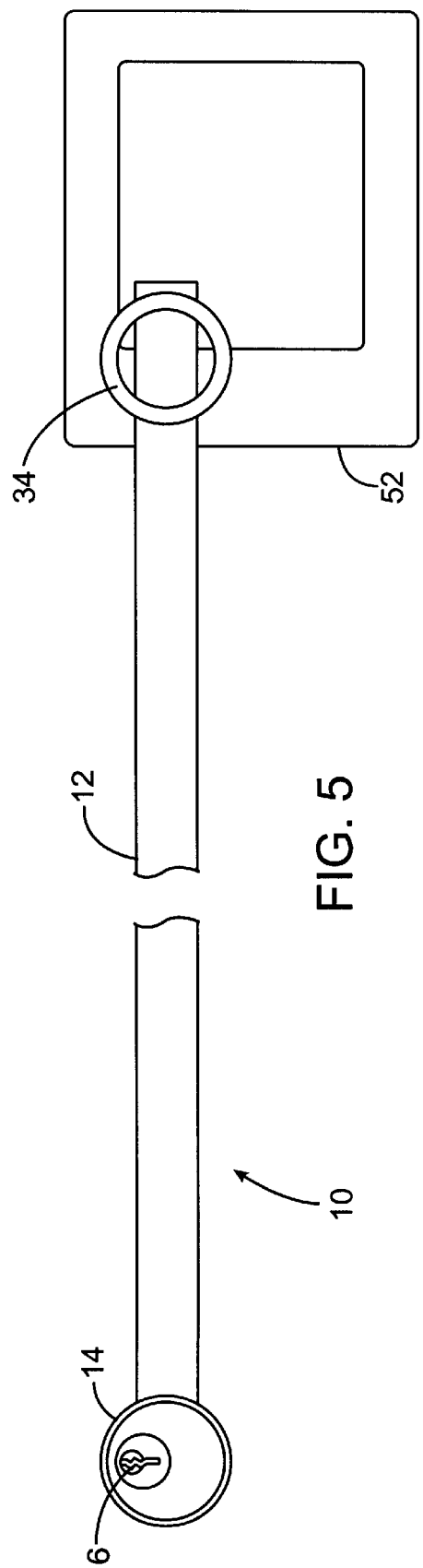

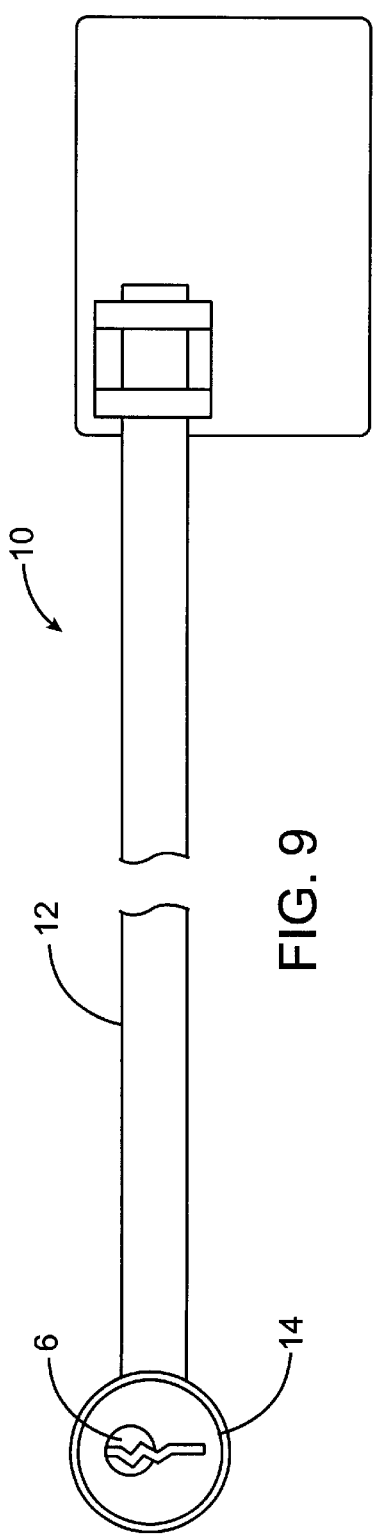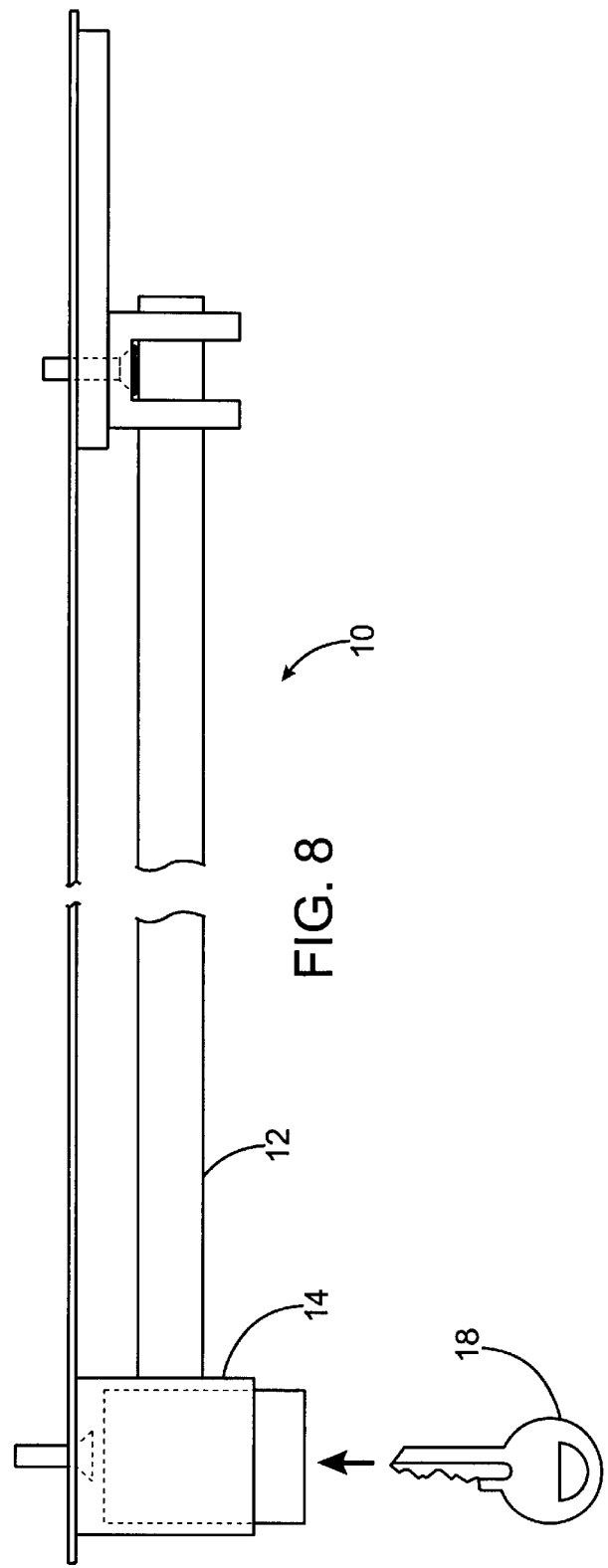

LICENSE PLATE LOCK

This application is related to co-pending patent application Ser. No. 09/052,909, filed Mar. 31, 1998, entitled "License Plate Lock", the disclosure of which is hereby referred to and incorporated herein by reference.

FIELD OF THE INVENTION

This invention relates in general to a locking means for locking license plate attachment bolts and in particular to a license plate attachment means having a locking means for preventing removal of either the license plate or the renewal sticker which may be affixed to the license plate in either of four locations. The locking means includes a cylinder lock with all functioning lock components, i.e., both the lock insertion projection and the insertion projection receiving trench/key way being hidden from observation by any viewer.

BACKGROUND OF THE INVENTION

A description of the related art is discussed in co-pending patent application Ser. No. 09/002,062, filed Dec. 31, 1997, entitled "Theft Proof License Plate Apparatus, which is hereby referred to and incorporated herein, and this same description is applicable herein. Whereas the license plate locking devise disclosed in said co-pending patent application functions very effectively for its intended purpose, the license plate locking device disclosed therein does have the following limitations:

a) The lock hasp, although hidden by a protective enclosure is readily apparent and if a criminal was motivated, there is the possibility that the criminal could use some powered cutting means that would cut through both the lock hasp and its protective enclosure.

b) the lock hasp and its protective enclosure, while positioned such that they are pleasing to the eye of the viewer or user of the license plate lock, they are somewhat bulky and do not present as clean a look as a more simplified locking mechanism that would accomplish the same theft prevention function.

c) The lock hasp design does not allow for an automatic 'snap' locking action, such that the operator could lock the device with one quick insertion by hand without having to unlock or open the lock prior to inserting the lock hasp and locking it.

Accordingly, it would be desirable if there were a license plate locking device that had both the lock insertion projection and the insertion projection receiving trench/key way being hidden from observation by any viewer.

Likewise it would be desirable if a renewal sticker theft prevention window locking device would function so as to be applicable for license plates which display such renewal stickers in any corner of the license plates. It would further be desirable if the license plate locking means if the license plate locking device/means uses the existing license plate screws/bolts for attachment.

It would further be desirable if the lock mechanism was capable of completing the locking function with one 'snap' locking action, such that the operator could lock the device with one quick insertion by hand without having to unlock or open the lock prior to locking it.

SUMMARY OF THE INVENTION

Briefly, the present invention is a locking device having a renewal sticker theft prevention window locking device that is applicable for license plates which display such renewal stickers in any corner of the license plates. The license plate locking means constructed according to the teachings of the invention uses a cylinder lock that has a flat sided cylindrical bar that cooperates with a grove or trench disposed in a second horizontal bar that extends between the license plate attachment screws so as to retain or lock the second horizontal bar by rigidly interfering with any movement of the second horizontal bar. The license plate locking means of the license plate locking device/means does use the existing license plate screws/bolts for attachment. The license plate attachment screw cylinders receive the existing license plate attachment screws and cooperates with a locking device to prevent removal of the license plate attachment screws.

BRIEF DESCRIPTION OF THE DRAWINGS

The invention may be understood and further advantages and uses thereof more readily apparent, when considered in view of the following detailed description of the exemplary embodiments, taken with the accompanying drawings, in which:

FIG. 5 is a top view of the locking plate locking means of FIG. 1 illustrating the grooved rod passing through the hollow cylindrical license plate bolt cover and being retained in the locked position within the cylindrical locking mechanism of FIG. 1. FIG. 5 also illustrates how the grooved rod passes through an additional hollow cylindrical license plate bolt cover on the opposite side, which bolt cover is mounted through a sticker tab cover, thereby protecting a license plate sticker tab from theft;

FIG. 8 is a top elevational view of the license plate locking means constructed according to the teachings of the invention illustrating the use of the alternate sticker tab cover and license plate bolt cover of FIG. 6 that allows the sticker tab cover to be located over any of each of the four corner areas of a license plate where a sticker tab may alternately be located in various States;

FIG. 9 is a front plan view of the license plate locking means constructed according to the teachings of the invention illustrating the use of the alternate sticker tab cover and license plate bolt cover that allows the sticker tab cover to be located over any of each of the four corner areas of a license plate where a sticker tab may alternately be located in various States.

DESCRIPTION OF THE PREFERRED EMBODIMENTS

Figure 1:
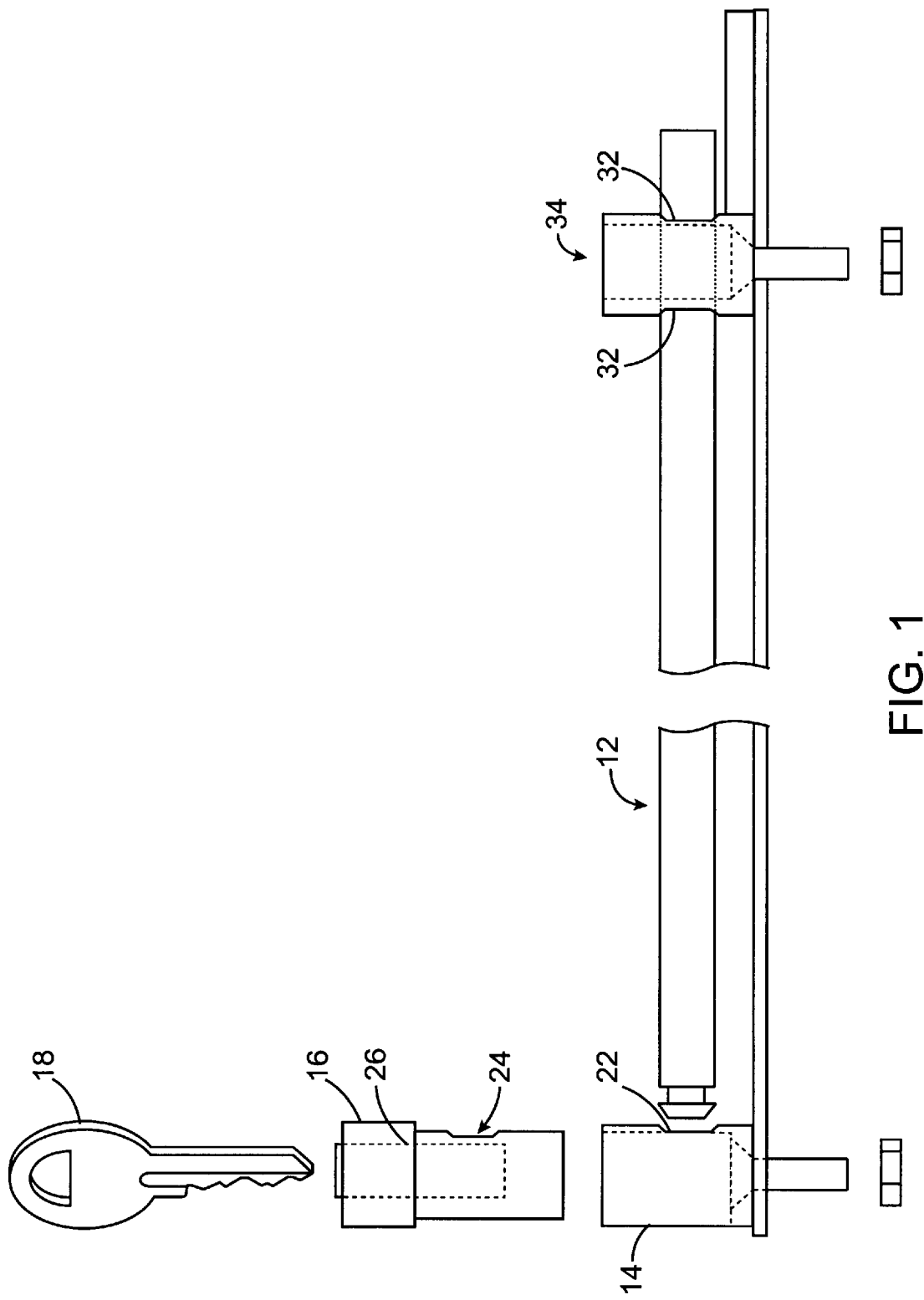
FIG. 1 is an elevational view of the license plate locking means constructed according to the teachings of the invention illustrating how a grooved rod enters a hollow cylindrical license plate bolt/screw cover and engages with a cylindrical locking mechanism.

Referring now to the drawings and to FIG. 1 in particular there is shown an elevational view of the license plate locking means 10 constructed according to the teachings of the invention illustrating how the grooved rod 12 enters the left hollow cylindrical license plate bolt/screw cover 14 and engages with a cylindrical locking mechanism 16. Grooved rod 12 enters bolt/screw cover 14 at rod opening 22 and enters cylindrical locking mechanism 16 through rod opening 24. Grooved rod 12 is captured within cylindrical locking mechanism by rotating projection means 26 which will be described later with to reference to FIGS. 4 and 4A. Grooved rod 12 is repeatably slidable through rod openings 32 disposed through right hollow cylindrical license plate bolt/screw cover 34. When grooved rod 12 has been slid through rod openings 32 disposed through right hollow cylindrical license plate bolt/screw cover 34 and inserted through bolt/screw cover 14 at rod opening 22 and enters cylindrical locking mechanism 16 through rod opening 24 and when grooved rod 12 is then captured within cylindrical locking mechanism by rotating projection means 26, then license plate bolts 36 (which have been previously attached/screwed to captured nuts 38), will be blocked from access through left and right bolt/screw covers 14 and 34 respectfully. In this manner the attached license plate will be protected from theft, vandalism etc. When cylindrical locking mechanism 16 is locked by means of key 18, then access is denied to anyone other than the owner of the vehicle/possessor of the key.

Figure 2:
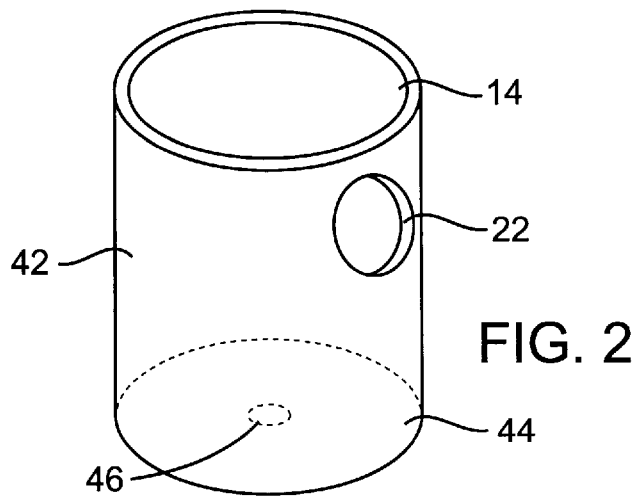
FIG. 2 is a detail isometric view of the hollow cylindrical license plate bolt/screw cover of FIG. 1, constructed according to the teachings of the invention.

Referring now to FIG. 2 there is shown a detail isometric view of the left hollow cylindrical license plate bolt/screw cover 14 of FIG. 1, constructed according to the teachings of the invention. Bolt/screw cover 14 includes cylindrical sidewall 42 having rod entry opening 22 and bottom plate 44 having license plate bolt hole 46 disposed there through. Referring now back to FIG. 1, similarly, right hollow cylindrical license plate bolt/screw cover 34 is constructed the same, except there are two rod openings 32 disposed therein. It is to be understood that left and right bolt/screw covers 14 and 34 could be reversed/interchanged and the licensed plate locking mechanism 10 would work equally well.

Figure 3:
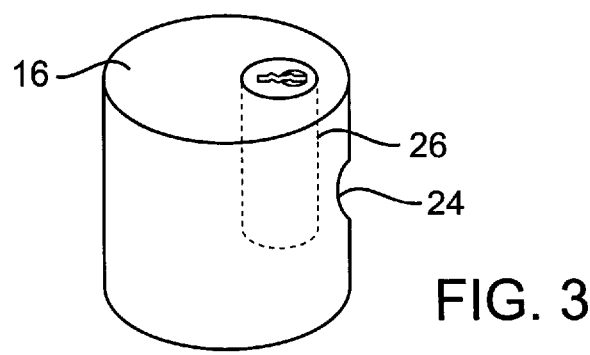
FIG. 3 is a detail isometric view of the cylindrical locking mechanism of FIG. 1, constructed according to the teachings of the invention.
Figure 4:
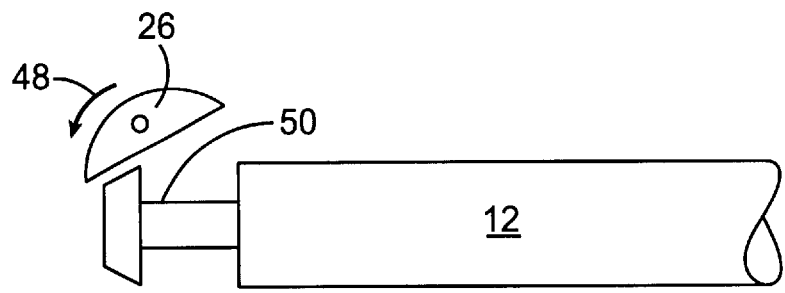
FIG. 4 is a detail view of the working elements of the cylindrical locking mechanism of FIG. 3.
Figure 4A:
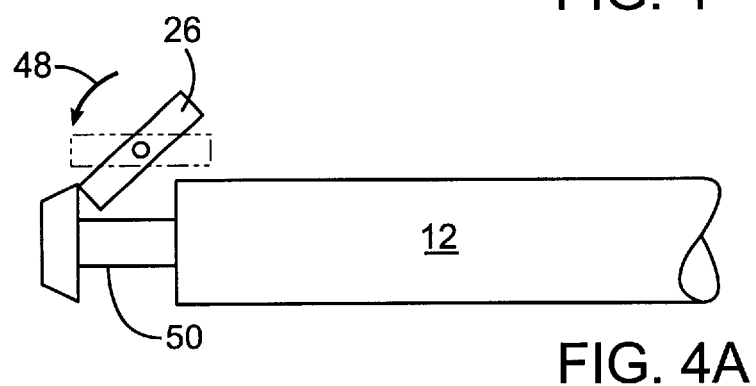
FIG. 4a is a detail view of another alternate set of the working elements of the cylindrical locking mechanism of FIG. 3.

Referring now to FIG. 3, there is shown a detail isometric view of the cylindrical locking mechanism 24 of FIG. 1, constructed according to the teachings of the invention and illustrates how rotating projection means 26 interferes with the passage of grooved rod 12 when it enters through rod opening 24. Referring now to FIG. 4, there is shown a detail view of the working elements of the cylindrical locking mechanism of FIG. 3, wherein rotating projection means 26 is biased so as to interfere with the passage of grooved rod 12, such that when grooved rod 12 is forced past rotating projection means 26, then rotating projection means 26 is biased into grove 50 as illustrated schematically in FIG. 4A, wherein there is shown in FIG. 4A a schematic detail view of the working elements of the cylindrical locking mechanism of FIG. 3, both when the grooved rod 12 is pushing past rotating projection means 26 (in phantom) and when grooved rod 12 has cleared rotating projection means 26, and rotating projection means 26 is biased by a biasing means, preferably by a spring so as to rotate counterclockwise as shown at arrow 48 so as to enter grove 50 as is well known in the art.

Referring now to FIG. 5 there is shown a top view of the license plate locking means of FIG. 1 illustrating the grooved rod passing through the left hollow cylindrical license plate bolt covers 14 respectfully, and being retained in the locked position within the cylindrical locking mechanism 16 of FIG. 1. FIG. 5 also illustrates how the grooved rod passes through additional hollow cylindrical license plate bolt cover 34 on the opposite side, which bolt cover is mounted through a sticker tab cover 52, thereby protecting a license plate sticker tab from theft.

Figure 6:
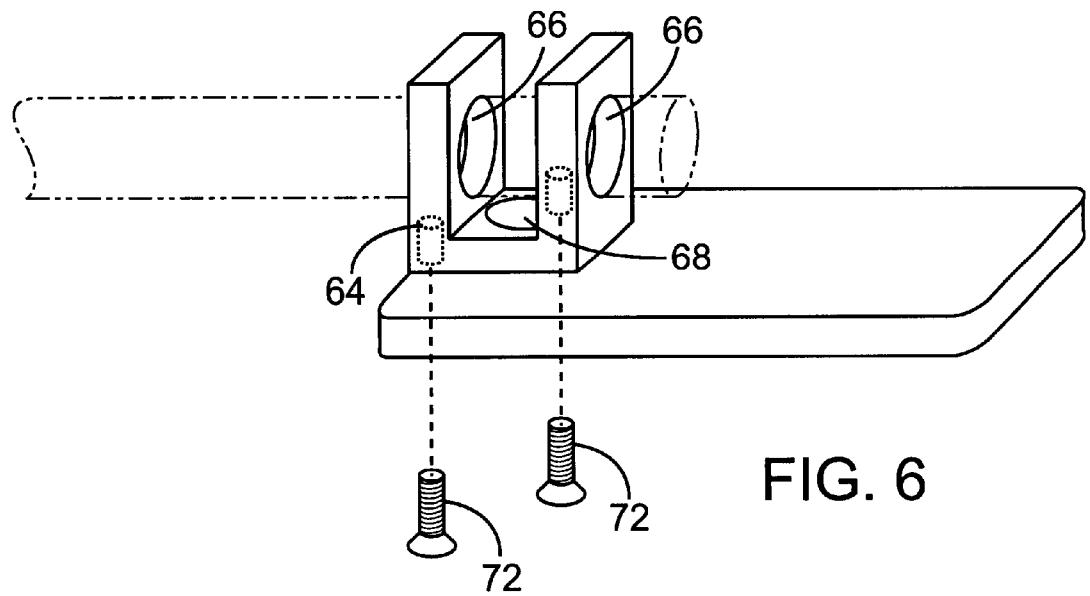
FIG. 6 is an isometric view of a plate bolt cover that allows the sticker tab cover to be located over any of each of the four corner areas of a license plate where a sticker tab may alternately be located in various States.

Referring now to FIG. 6 there is shown an isometric view of an alternate sticker tab cover 62 and license plate bolt cover 64 that allows the sticker tab cover to be located over any of each of the four corner areas of a license plate where a sticker tab may alternately be located in various States. Note that bolt cover 64 includes rod openings 66 such that a grooved rod 68 may be slidably passed therethrough so as to prevent access to license plate bolt opening 70. Sticker tab cover 62, (which may for example be made out of Lexan Plexiglas and have dimensions of 2" high×3" wide×¼" thick) and license plate bolt cover 64 are rigidly attached to one another by screws 72.

Figure 7:
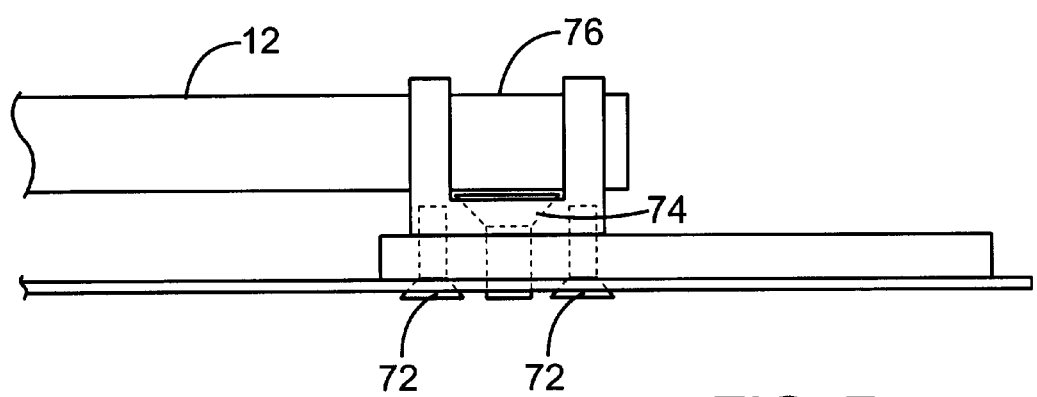
FIG. 7 is an elevational view of the alternate sticker tab cover and license plate bolt cover of FIG. 6 illustrating the alternate sticker tab cover and license plate bolt cover affixed to and locking a license plate to a car body.

Referring now to FIG. 7 there is shown an elevational view of the alternate sticker tab cover 62 and license plate bolt cover 64 of FIG. 6 illustrating the alternate sticker tab cover 62 and license plate bolt cover 64 affixed to and locking a license plate to a car body by means of license plate bolt 74 for which access is denied by means of lock rod 76.

Referring now to FIG. 8 there is shown a top elevational view of the license plate locking means constructed according to the teachings of the invention illustrating the use of the alternate sticker tab cover and license plate bolt cover of FIG. 6 that allows the sticker tab cover to be located over any of each of the four corner areas of a license plate where a sticker tab may alternately be located in various States. Referring now to FIG. 9 there is shown a front plan view of the license plate locking means constructed according to the teachings of the invention illustrating the use of the alternate sticker tab cover and license plate bolt cover that allows the sticker tab cover to be located over any of each of the four corner areas of a license plate where a sticker tab may alternately be located in various States.

Figure 10:
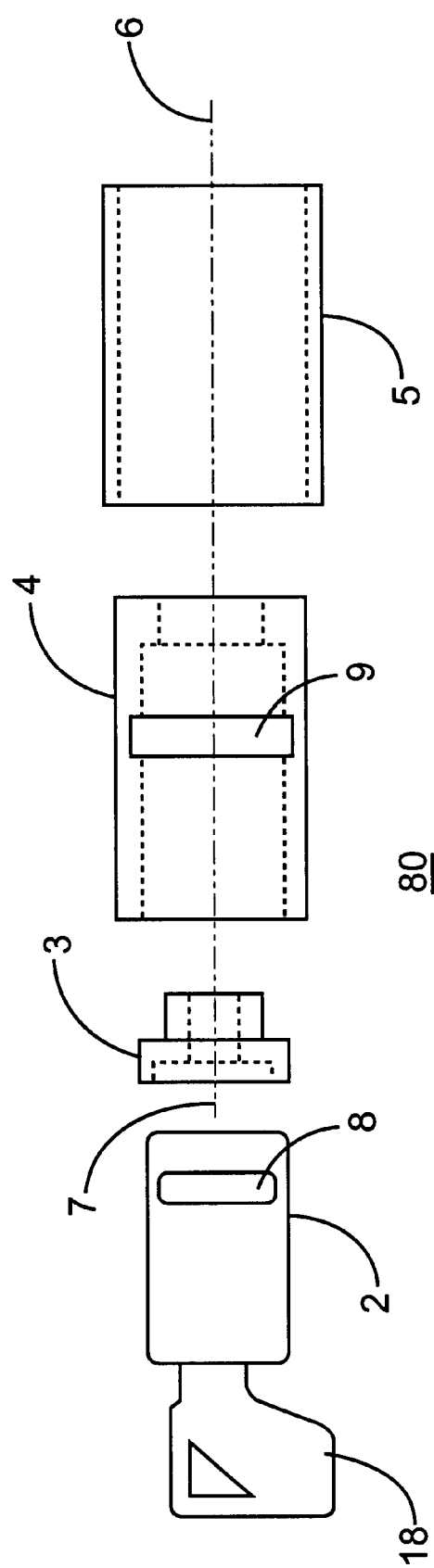
FIG. 10 is an elevational view of an alternate license plate bolt cylindrical locking device.

Referring now to FIG. 10, there is shown an elevational view of an alternate license plate bolt cylindrical locking device 80 or indeed any bolt/screw cylindrical locking device because locking device 80 can be employed to prevent access to any bolt or screw or indeed any type of fastener. Locking device 80 includes cylinder lock 2, which is operated by key 1, and which blocks access to flange 3, which is inserted into hollow cylindrical bolt cover 4, all of which mechanism is then inserted through hollow cylinder cover 5. When a bolt is inserted through flange 3 along centerline 6 at entry 7, and flange 3 is then inserted into hollow cylindrical bolt cover 4 and cylindrical lock 2 is then locked into hollow cylindrical bolt cover 4 by means of projection 8 being inserted and retained in projection retainer groove 9, then hollow cylindrical bolt cover 4 will just rotate around flange 3 and never release until cylindrical lock 2 is unlocked by key 1, thereby preventing access to the secured bolt.

I claim:

1. A license plate locking device, comprising:
   a) a hollow cylindrical bolt cover having a bottom closure with a bolt aperture opening disposed therethrough; and
   b) a cylindrical lock locking means disposed in said hollow cylindrical bolt cover for preventing access to said bolt aperture opening to provide for security from tampering with a previously inserted license plate bolt, wherein, the hollow cylindrical bolt cover includes a cylindrical sidewall having a rod opening disposed therein and wherein said cylindrical lock locking means includes a cylinder lock having a lock mechanism and a cylindrical sidewall with a rod opening disposed therein so as to be concentric with the rod opening disposed in the cylindrical sidewall of the hollow cylindrical bolt cover when said cylinder lock is inserted in the hollow cylindrical bolt cover, and wherein said cylindrical lock locking means further includes a grooved rod that when inserted through said concentric rod openings, said lock mechanism releasably captures said grooved rod.

2. The license plate locking device of claim 1, further including a second bolt access security device disposed on the grooved rod, said second bolt access security device comprising a U shaped bolt cover having a bottom surface plate with a license bolt aperture disposed therethrough and two side surface plates, each having concentric rod openings disposed therethrough, said grooved rod being slidably inserted through said concentric rod openings to prevent access to said license bolt.

3. The license plate locking device of claim 2, wherein said cylinder lock includes a rotating projection means that is biased to rotate said projection means into projection contact with said groove of said grooved rod to provide for capturing said grooved rod.

4. The license plate locking device of claim 3, further including a clear see through sticker tab protector having predetermined dimensions sized to cover the sticker tab, said sticker tab protector being permanently and rigidly affixed to the bottom surface plate of said U shaped bolt cover to prevent access to any sticker tab that may be affixed to the license plate, depending on said U shaped bolt's and said sticker tab's orientation.

* * * * *